United States Patent [19]
Hansen

[11] Patent Number: 6,164,672
[45] Date of Patent: Dec. 26, 2000

[54] HOCKEY EQUIPMENT BAG TRANSPORTER

[76] Inventor: James K. Hansen, 4094 Majestic La., Fairfax, Va. 22033

[21] Appl. No.: 09/318,955

[22] Filed: May 26, 1999

[51] Int. Cl.$^7$ ........................................................ B62B 1/02
[52] U.S. Cl. ...................................... 280/47.24; 280/47.26
[58] Field of Search ............................... 280/8, 35, 638, 280/659, 47.17, 47.18, 47.19, 47.24, 47.26, 47.29, 47.35, 79.2, 814, 655.1

[56] References Cited

U.S. PATENT DOCUMENTS

| | | | |
|---|---|---|---|
| 2,590,154 | 3/1952 | Burns | 280/47.24 |
| 2,918,297 | 12/1959 | Peters | 280/47.26 |
| 4,848,782 | 7/1989 | Schmidt | 280/47.26 |
| 5,244,220 | 9/1993 | Cortez | 280/47.26 |
| 5,797,612 | 8/1998 | Buccioni | 280/47.26 |

*Primary Examiner*—Richard M. Camby

[57] ABSTRACT

The invention disclosed herein is a vehicle which attaches to an existing flexible hockey equipment bag which enables the bag to be easily transported via wheels, instead of hoisting it over one's shoulder awkwardly. Hockey sticks can be inserted into the engaging jaws, permitting the apparatus and attached bag to be maneuvered using the hockey sticks as a handle. A locking compartment is utilized for a player to put valuables while the bag is unattended. Also a provision for locking the bag to a stationary object has been included. This invention allows for a hockey player to keep the advantages of a flexible bag (i.e. fits inside a car keeping equipment warm), while being able to move the bag on its wheels and secure valuables when unattended.

6 Claims, 4 Drawing Sheets

HOCKEY EQUIPMENT BAG TRANSPORTER

BACKGROUND OF THE INVENTION

The current invention is a vehicle, adapted to travel on land, indoors or outdoors, for the explicit purpose of carrying a hockey equipment bag and related accessories. It falls under the United States Patent Class 280, Land Vehicles, in the Subclass 47.24 which refers to tiltable vehicles which have wheel; spaced apart laterally from the direction of movement of the vehicle and are stabilized by an attendant by which a force can be applied through a handle means to propel it.

Due to the nature of the game of hockey, a lot of equipment is required to play. This includes skates, shin pads, hockey pants, elbow pads, shoulder pads, helmet and gloves. This equipment is heavy and bulky and is usually carried in a large bag over one's shoulder while the opposite hand carries the player's sticks. This leaves no hands free for opening doors or for carrying anything else. Also, the bags are often longer than most doors are wide, causing additional problems when carried over the shoulder. The disclosed invention eliminates this awkwardness by encompassing all of the equipment into one compact, rolling system.

The only known example of prior art exists with U.S. Pat. No. 5,797,612 (Buccioni) which consists of a complete, rigid, hockey equipment container on wheels. The down sides of this carrier are as follows: firstly, one must purchase this rigid, complex, container even if the person already has a hockey equipment bag, which because of its intricacies can be very expensive. Secondly, the design calls for sticks to be secured in the container by the blade end, which means that a separate carrier would be required for goaltenders (whose stick blades are much larger and of a different shape). Thirdly, because of the large, rigid nature of this previous design, the bag cannot conform to interior automobile spaces in the way that a flexible bag can. It is designed to mount on the exterior of an automobile, which can make equipment cold and uncomfortable to wear. One final shortcoming of this design is that there is no lockable compartment for valuables and no provision for locking the carrier to a stationary object for security. All of these shortcomings are eliminated with the present invention.

BRIEF SUMMARY OF THE INVENTION

The current invention is a vehicle designed to mount to an existing, flexible, hockey equipment bag enabling the bag to be easily transported via wheels, instead of hoisting it over one's shoulder awkwardly. The invention ("transporter") mounts to both the underside and one end of a typical flexible hockey equipment bag. The carrier has a wheel on each corner of the base, so that when one or two hockey sticks is inserted into the stick engaging jaws, the transporter and attached bag can be pulled by the hockey sticks along the ground or floor on its wheels. The traditional carrying method involves hoisting the heavy hockey equipment bag over the shoulder on one arm and carrying the player's sticks in the other hand, leaving no hands free to open doors. This invention combines all the heavy and awkward equipment of the average hockey player into one compact wheeled system, reducing the carrying weight and leaving one hand free for the person to negotiate doorways, stairs, tight spaces, and so forth. The shortcomings of the only known similar invention (Buccioni, U.S. Pat. No. 5,797,612) are solved by the present invention as follows: the disclosed invention is designed to mount to an existing flexible hockey equipment bag, requiring only the purchase of the transporter, and not the elaborate equipment container, reducing costs tremendously. Also, with the disclosed invention, hockey sticks are secured by the handle end and the shaft instead of by the blade end. This ensures that the same transporter can be used by goalies, forwards, and defensemen interchangeably. In addition, the disclosed invention mounts to flexible hockey equipment bags, so players can still fit these bags in the passenger compartment of their vehicles and keep their equipment warm and ready-to-wear when traveling in winter months. Finally, the disclosed invention contains a lockable valuables compartment and a provision for locking the transporter to a stationary object deterring theft, while left unattended.

DETAILED DESCRIPTION OF THE INVENTION

Figure 1:
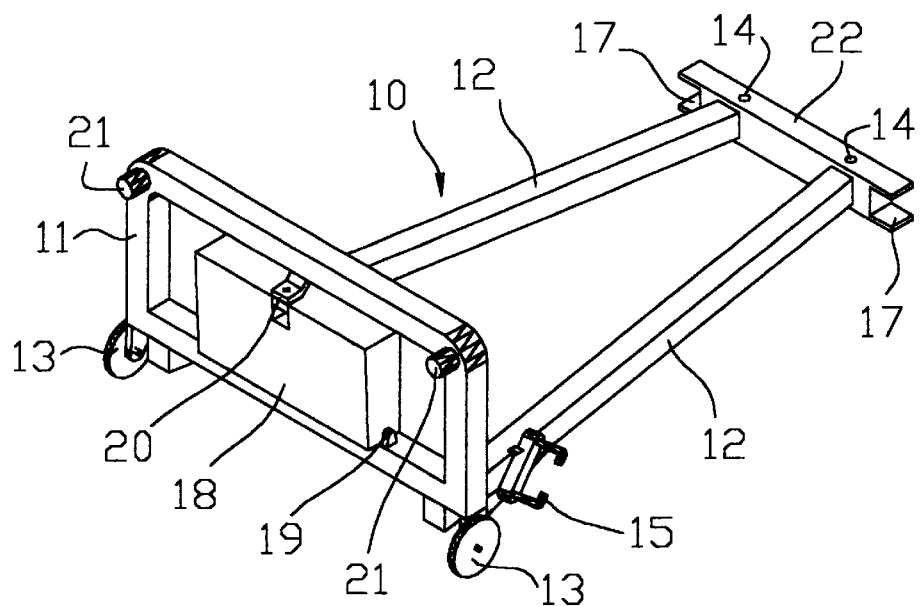
FIG. 1 is a perspective view of the transporter in a stationary position.

The detailed description of the present invention is enclosed herein; however, it is to be understood that the disclosed description is merely exemplary of the invention, which may be embodied in various forms. Therefore, these details are not to be interpreted as limited, but as a basis for the claims and as a basis for teaching one skilled in the art how to make and use the invention.

The present invention consists of a wheeled transporter which when attached to an existing hockey equipment bag ("bag") provides the user with an easy method for transporting bulky hockey equipment and hockey sticks with one hand. This invention allows the user to keep the benefits of a flexible bag (i.e. fits inside small cars), but also has provisions for locking valuables in a small rigid compartment, and locking the bag and transporter to a stationary object, deterring theft.

Referring to the drawings, the transporter 10 (the current invention) is comprised primarily of a vertical member 11 and a horizontal member 12 which together support the hockey equipment bag 16. The bag 16 is fastened to both the horizontal member 12 and the vertical member 11 through the use of common releasable or permanent fasteners 14. Wheels 13 are located at the lower corners for ease of transport.

Figure 4:
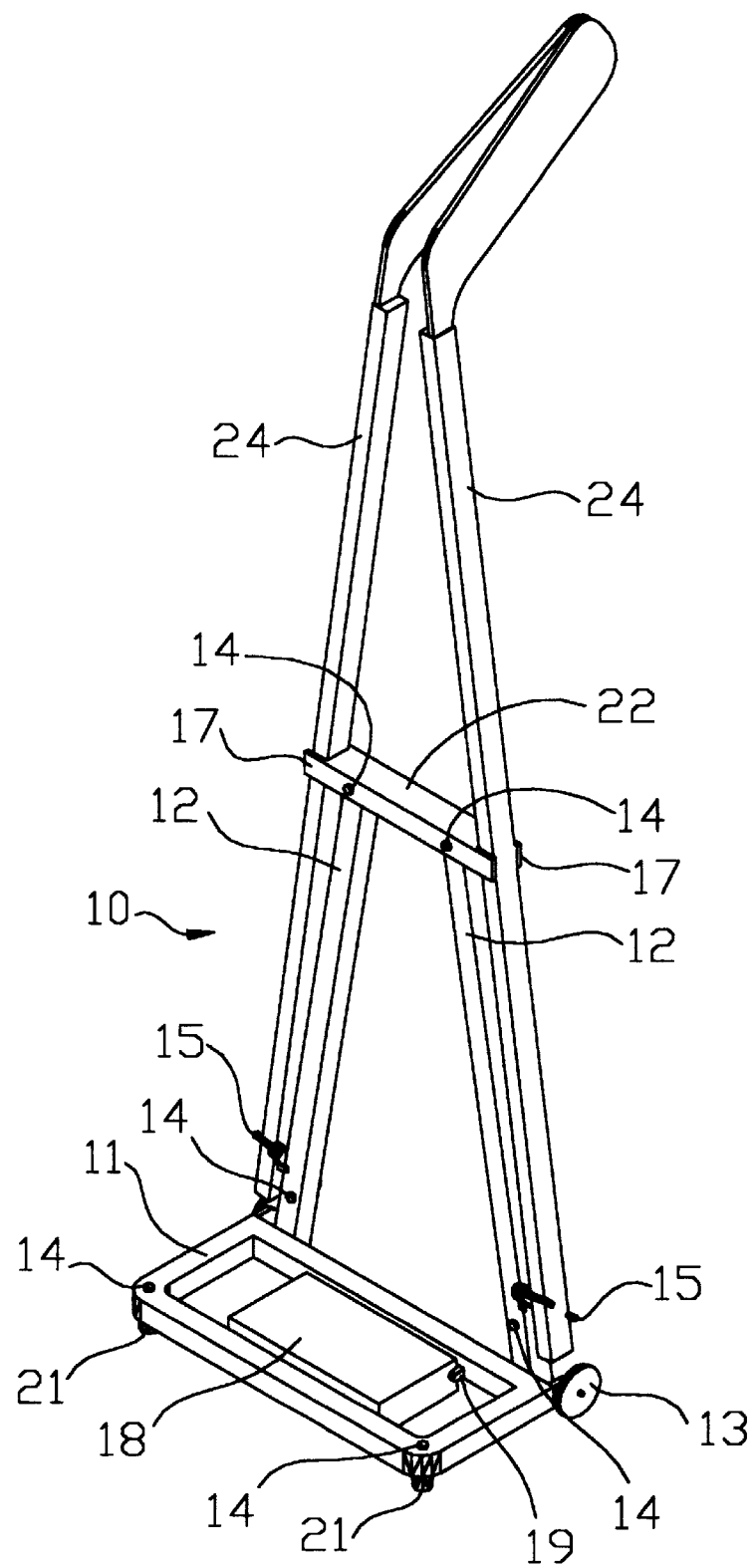
FIG. 4 is a perspective view of the transporter in a vertical stationary position shown without the hockey equipment bag but with the sticks secured.

Mounted on the horizontal member 12 are two pairs of angular engaging jaws 15, which frictionally hold the handle end of the hockey sticks 24, and two midpoint stick slots 17 which hold the stick 24 on its shaft, best seen in FIG. 4.

The lockable valuables compartment 18, the hinges 19 about which the compartment rotates, and the hasp 20 to lock it are all encompassed within the vertical member 11. Also shown on the vertical member 11 are a pair of legs 21 which, along with the wheels 13, provide stability in the resting position as in FIG. 3.

Figure 5:
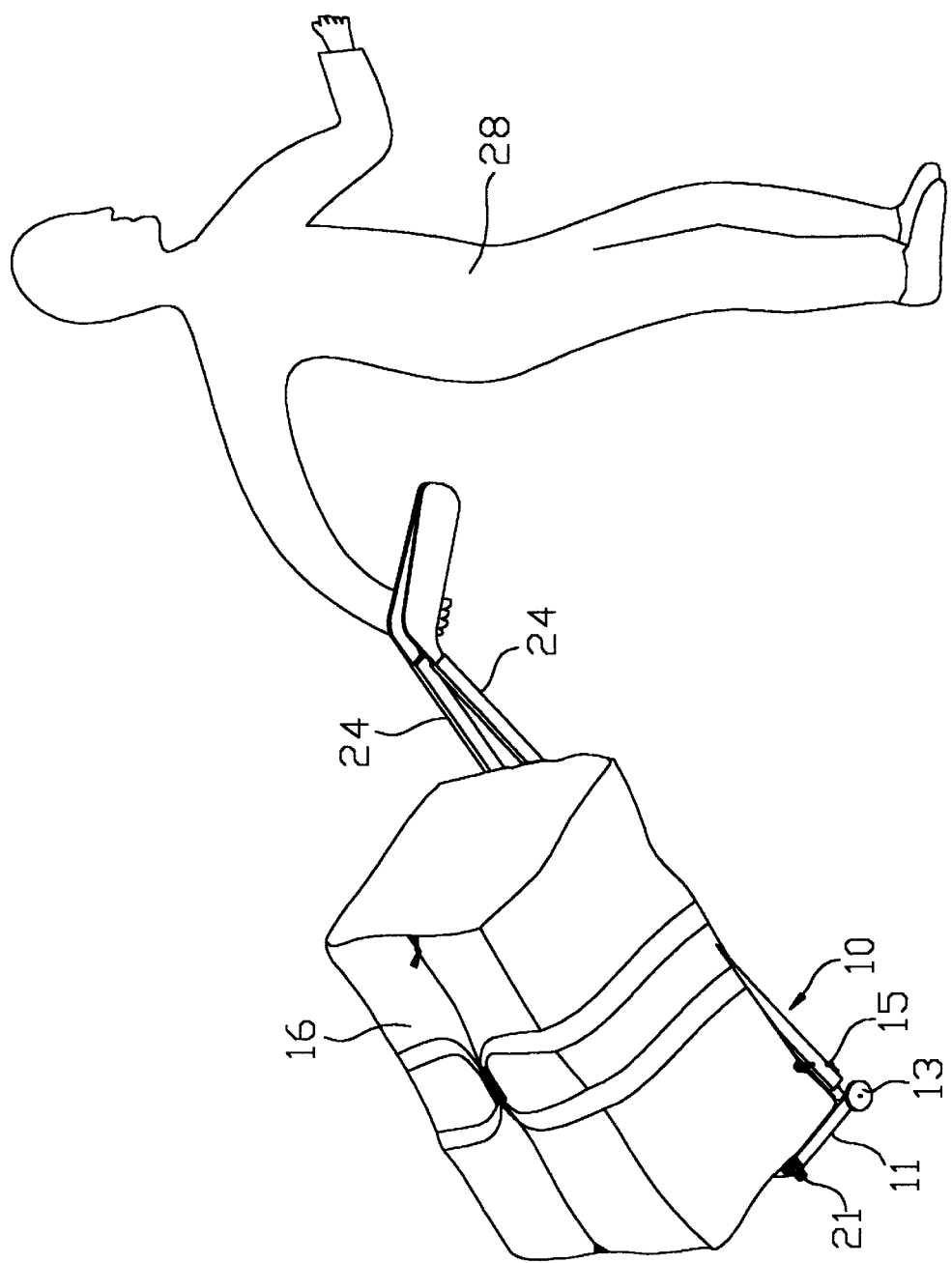
FIG. 5 is a perspective view of the transporter with hockey bag attached shown being moved by a person.
Figure 6:
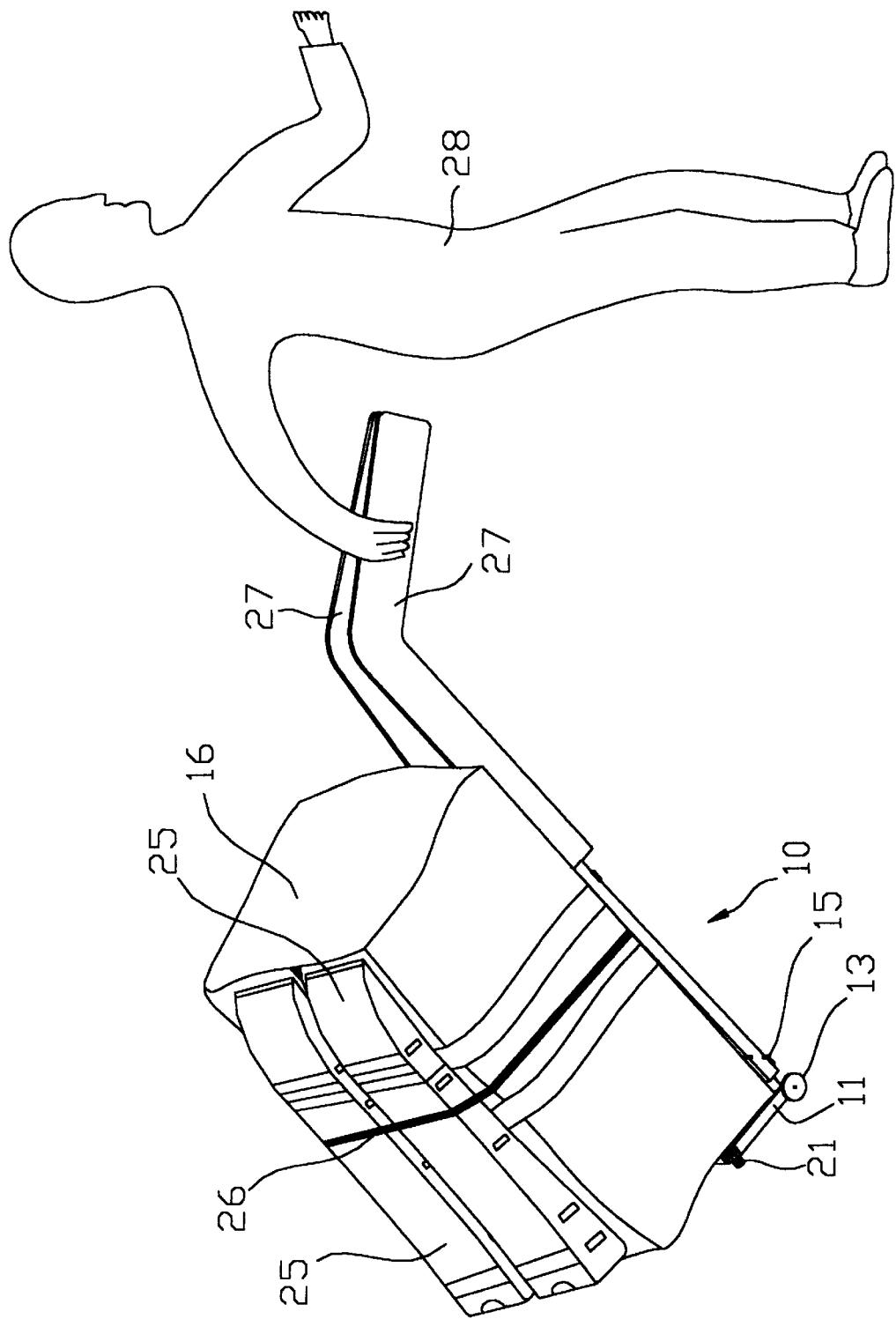
FIG. 6 is a perspective view of the transporter with hockey equipment bag, goalie leg pads, and goalie sticks secured, shown being moved by a person.

The horizontal member 12 is shown joined by a forward cross-member 22 giving rigidity to the system. Located on the underside of the horizontal member 12 are protrusions 23, best visible in FIG. 2 and FIG. 3, which protect the transporter, bag, and sticks from damage when ascending or descending stairs or curbs. The standard hockey sticks 24 (for forwards and defensemen) are shown in FIGS. 2–5, while FIG. 6 shows the adaptability of the system in that goaltender sticks 27 fit in the same engaging jaws 15. FIGS. 5 and 6 depict the transporter in motion being pulled by a person 28. FIG. 6 shows a person carrying goaltender equipment including goaltender sticks 27 and goaltender leg pads 25, which are held down by the pad strap 26.

Figure 2:
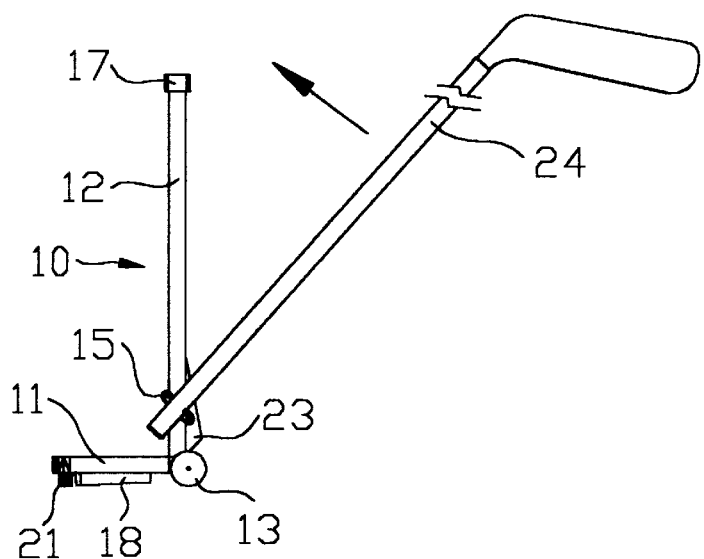
FIG. 2 is an elevation view of the transporter in a vertical stationary position showing the first step involved in securing a hockey stick to the bottom.
Figure 3:
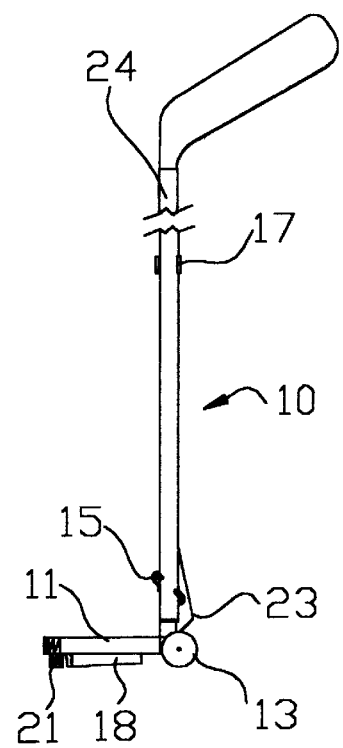
FIG. 3 is an elevation view of the transporter in a vertical stationary position showing the position of the hockey stick when secured.

In addition, FIGS. 2 and 3 show the basic process for inserting and securing the sticks 24 on the transporter 10. The handle end of the stick 24 is inserted into the angled engaging jaws 15 at 45 degrees out from the horizontal member 12 (which appears vertically in the figure), as in FIG. 2. The arrow on FIG. 2 indicates the direction of the next movement which involves lifting the blade end of the stick upwards and inserting the shaft into the midpoint stick slot 17. The blades are then used as the handle for carrying as in FIG. 5. Note, the hockey sticks 24 in FIGS. 2 and 3 are shown shorter than usual with broken lines indicating the removed sections; this has been done to increase the clarity of the figures.

Although a certain preferred embodiment has been disclosed, it is in no way intended to limit the invention or the protection afforded by the claims.

I claim:

1. A hockey equipment bag transporter which can be mounted to an existing flexible hockey equipment bag to facilitate transport of hockey equipment, comprising:

a. vertical and horizontal members at a right angle to each other to which the end and bottom surface of an existing, rectangular, hockey equipment bag are attached, respectively;

b. left and right wheels and axles mounted on or below the horizontal member near the location of the vertical member for ease of transport;

c. two pairs of angled engaging jaws, attached to the horizontal member, to permit receiving of and frictionally holding up to two separate hockey sticks by the handle end, parallel to and along the bottom of the hockey equipment bag, wherein the shafts of the sticks are additionally supported frictionally in slots, one on each side of the transporter, and the blade ends extend beyond the forward end of the bag and are used as a handle to maneuver the bag transporter;

d. common fasteners located on the horizontal and vertical members, for attach the hockey equipment bag permanently or temporarily to the transporter.

2. The transporter of claim 1, wherein said horizontal and vertical members are manufactured of a rigid, impact-resistant material.

3. The transporter of claim 2, wherein at least one exterior leg exists at the top of the vertical member to, in conjunction with the wheels, support the transporter and its attached bag on their ends, with said hockey sticks nearly perpendicular to the floor.

4. The transporter of claim 2, wherein two protrusions of a durable, impact-resistant material exist on the underside of the horizontal member, one on each side, to protect the transporter, hockey equipment bag, and attached sticks when carried up and down stairs or curbs.

5. The transporter of claim 2, wherein a small, lockable compartment with a hasp is attached to the vertical member where the hockey player can put valuables for safe-keeping when the bag and transporter are unattended, and wherein the same lockable hasp can also be used to attach the transporter to a stationary object using a cable-type lock to deter theft.

6. The transporter of claim 2, wherein a strap is connected to the horizontal member to secure a pair of goaltender leg pads or other bulky equipment on top of the hockey equipment bag facilitating transport.

* * * * *